United States Patent Office 3,427,400
Patented Feb. 11, 1969

3,427,400

DATA TRANSMISSION OF VARIABLE BLOCK LENGTHS OVER HALF DUPLEX NETWORKS

Esmond Philip Goodwin Wright, London, England, assignor to International Standard Electric Corporation, New York, N.Y., a corporation of Delaware Filed Feb. 10, 1965, Ser. No. 431,557
Claims priority, application Great Britain, Feb. 13, 1964, 6,098/64
U.S. Cl. 178—69 5 Claims
Int. Cl. H04l 25/02, 17/00, 17/16

ABSTRACT OF THE DISCLOSURE

Data transmission system equipped to transmit variable length blocks of data. End-of-block signals are transmitted to indicate the end of each block. The transmitting stations detect false end-of-block signals and retransmit reinserted proper signals after blocking the detectors for one character time length.

An object of this invention is to provide systems for transmitting blocks of data of variable lengths over telecommunication circuits using end-of-block signals and having means for determining instances when the transmitted message includes a sequence of signals used as the end-of-block signals and to enable proper transmission and receipt of such a message.

A more particular object of the present invention is to provide the transmitting stations, as well as the receiving stations with end-of-block detector means. At the sending station, such means includes "false end-of-block detector means."

Yet, a more particular object of this invention is to provide means operated responsive to detecting said false of block signal for retransmitting the end-of-block detectors during the first character of such transmission.

According to one embodiment of the invention there is provided a data transmission system in which individual blocks of data are transmitted over a channel in a forward direction and supervisory information is transmitted over a channel in the backward direction, the system utilizing unique service signals in the transmitted data to introduce changes in procedure, and including detection means at the sending station to detect the presence of false service signals in the message text as received, and means for transmitting the subsequent data prefixed by a unique signal allowing the message to be presented correctly at the receiving station.

Figure 1:
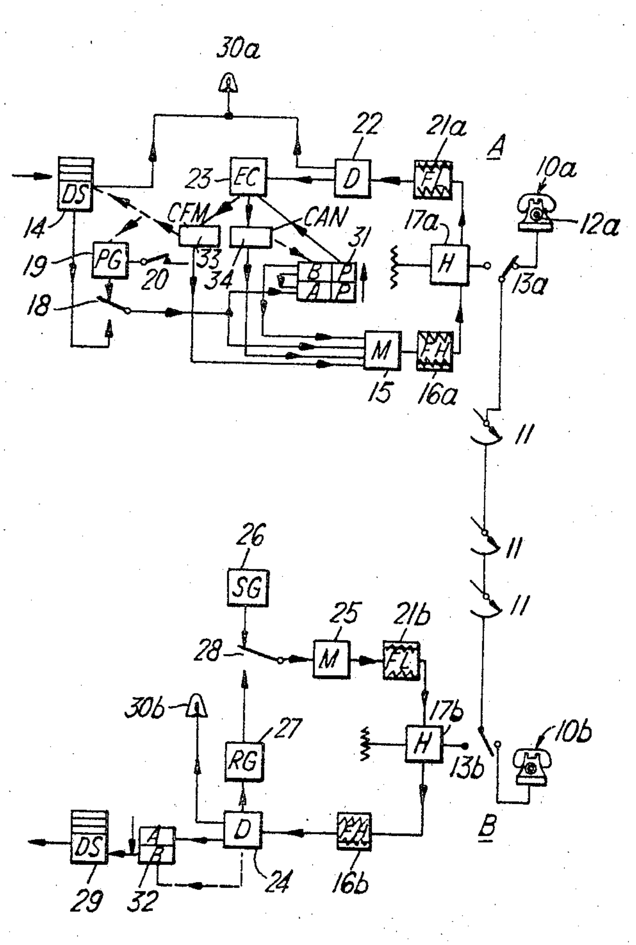
Figure 2:
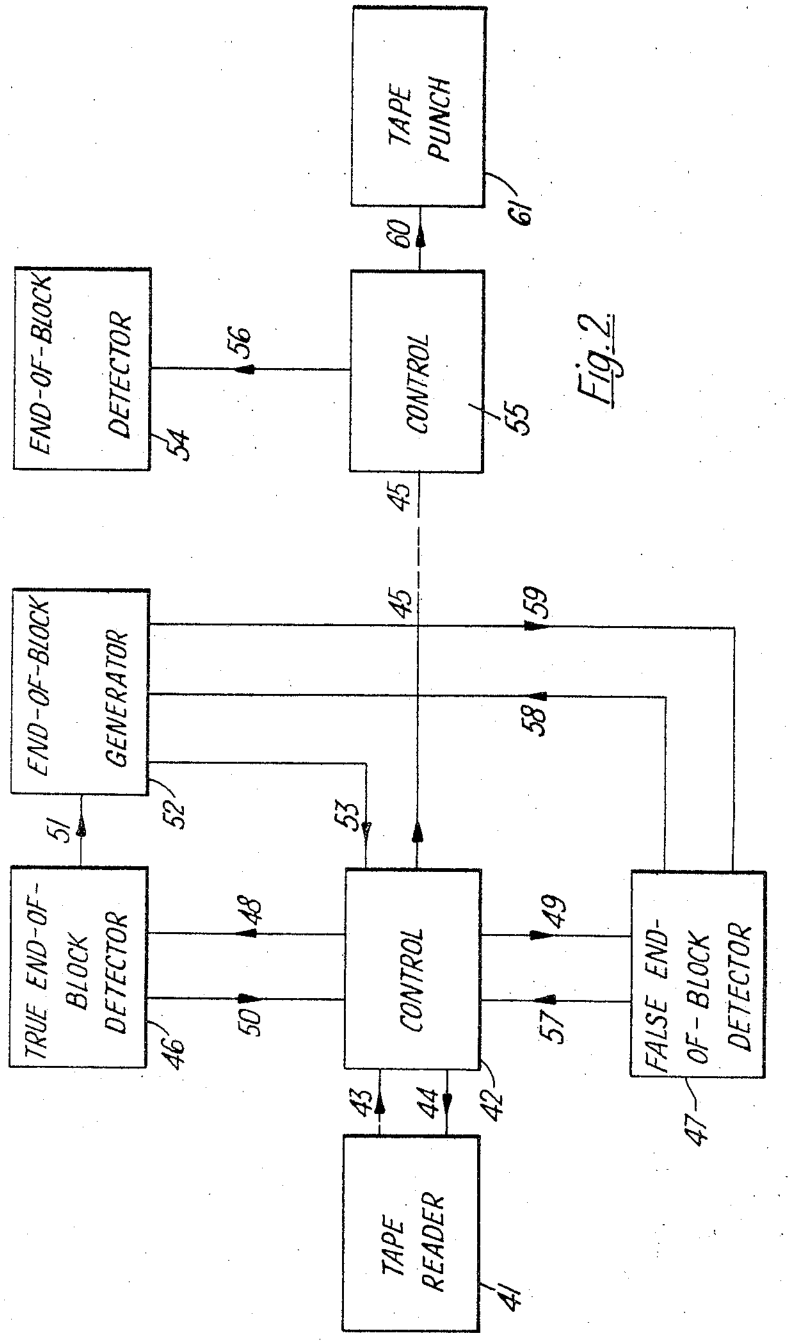
Figure 3:
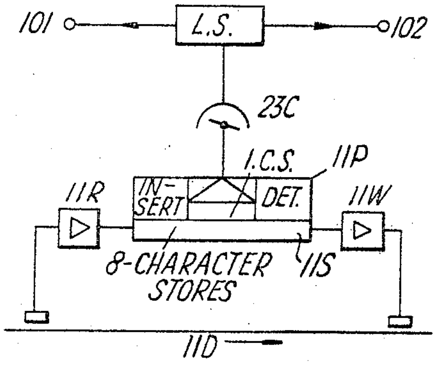
Figure 4:
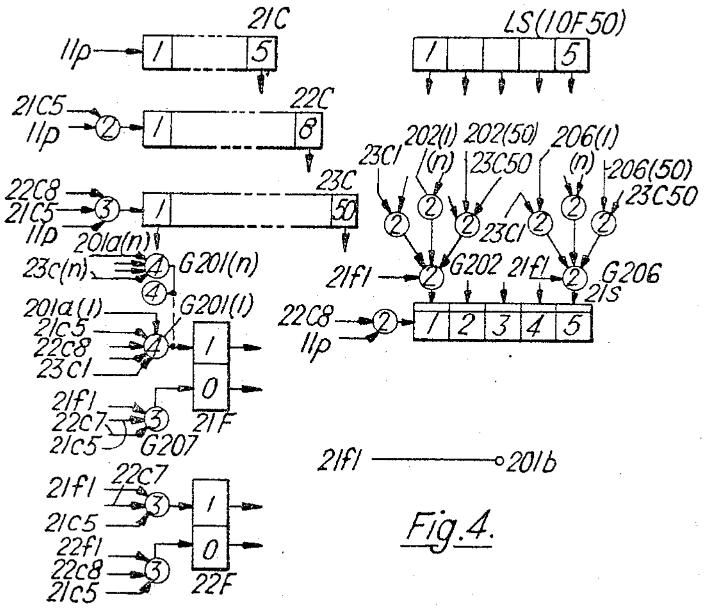
Figure 5:
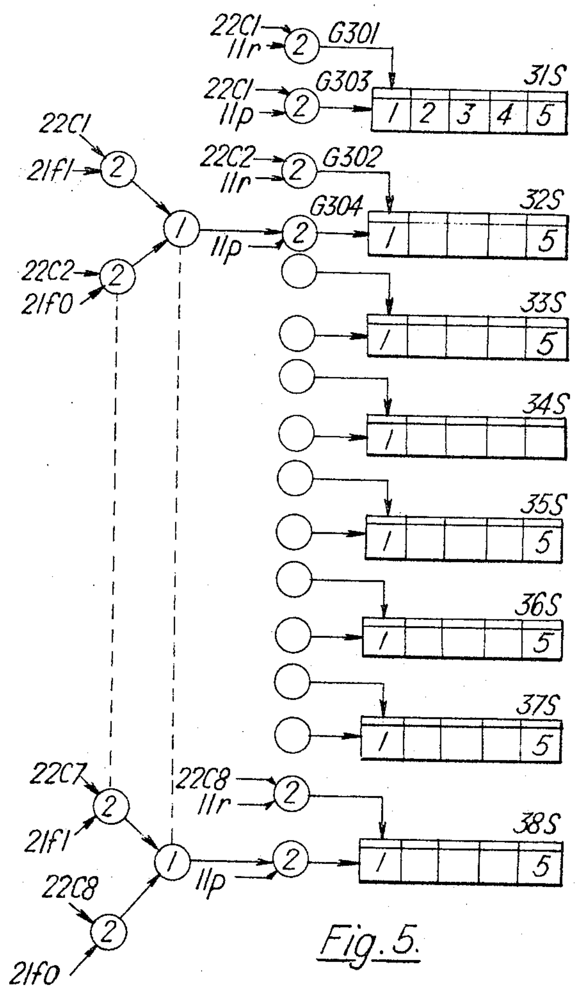
Figures 6, 7:
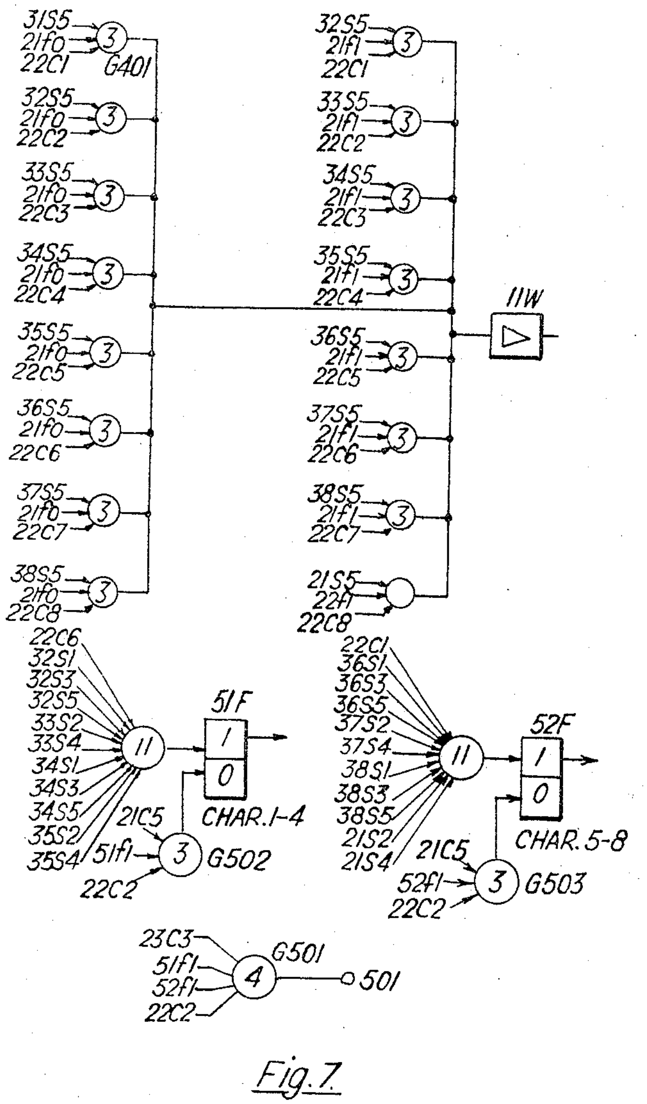
Figure 8:
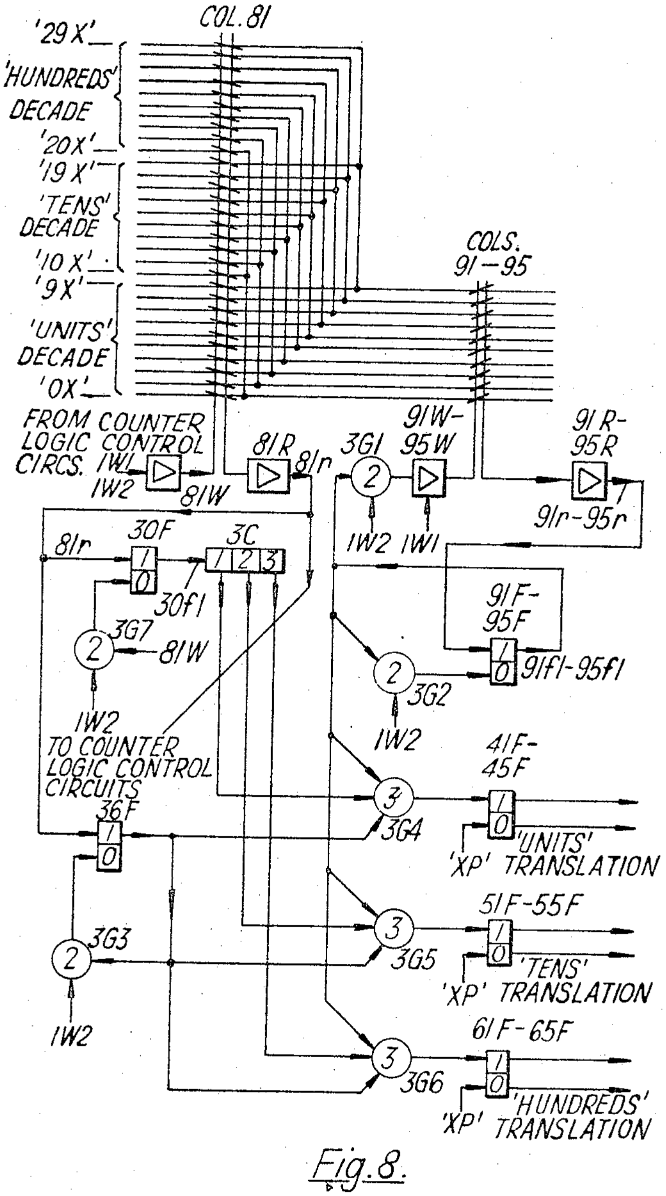
Figure 9:
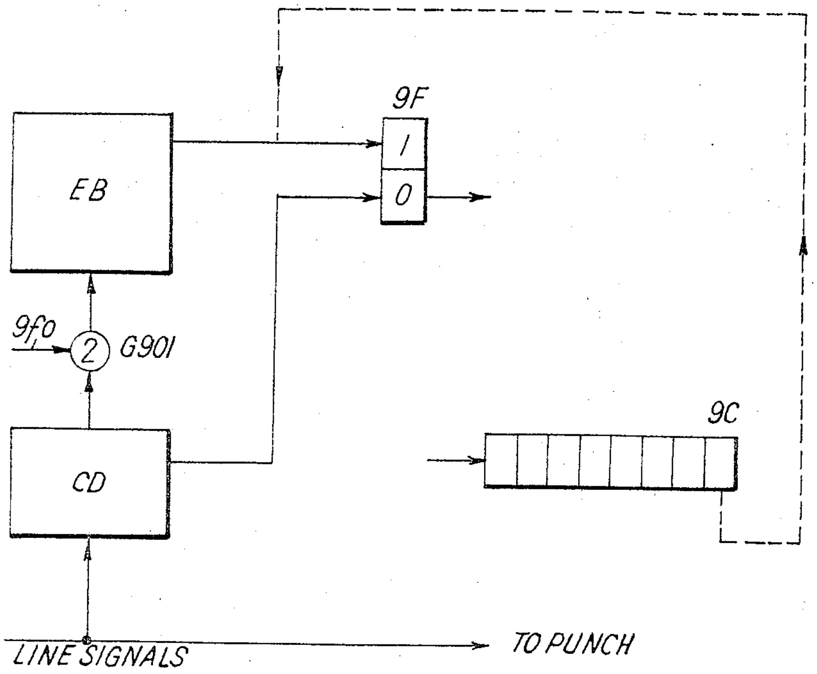

These and other objects and features of this invention will become apparent from the following description of the invention taken in conjunction with the following drawings, wherein:

FIG. 1 is a simplified block diagram of a data system to which the invention is applicable, FIG. 2 is a block diagram of an embodiment of the invention, FIG. 3 is a block diagram of an "end-of-block" sequence detector, FIG. 4 shows additional control equipment in the end-of-block detector, FIG. 5 shows the reading circuit and temporary character stores in the end-of-block detector, FIG. 6 shows the recording (and re-recording) circuit in the end-of-block detector, FIG. 7 shows the character detection equipment for selected characters in the end-of-block detector, FIG. 8 shows equipment for generating a code group in response to predetermined stimuli, and FIG. 9 illustrates part of the control circuit in the receiver.

Before going on to a detailed description of the specific embodiment, however, it is necessary to discuss at some length the kind of data transmission system in which the invention may be expected to operate, and the general manner of its operation in such system.

For certain forms of data transmission in which error correction by block retransmission is used, it is desirable to employ a channel over which data is transmitted in the forward direction, and a channel over which supervisory information is transmitted in the backward direction. Such channels can be constituted by a single channel, as in a half-duplex telegraph system, but this is not essential to the carrying out of the invention. If the messages are relatively long it is usual and indeed often advisable, to send the data in the form of a number of independent blocks which can be checked and corrected in sequence. With some forms of message it is an advantage to allow the length of the block to vary and this implies that the receiving station cannot count the number of bits in a block in order to separate out successive blocks, but must detect a service signal contained in the data received for this function.

In FIG. 1, two sets of subscribers' apparatus A and B, each including a normal telephone subscriber's set 10*a* or 10*b*, are connected together through the telephone network by means of switches 11, of which there will, in general, be a number in tandem. A connection between the subscribers is set up in the usual way by the operation of a calling dial 12*a* (throughout this description it is assumed that subscriber A is the calling and transmitting subscriber). In due course, the call will be answered at 10*b*, and subscriber A then informs subscriber B that he has data in store which it is now desired to transfer to B. At an agreed moment, keys 13*a* and 13*b* at the respective stations are switched over so as to transfer the connection to data storage, transmission and receiving equipment. It will be appreciated that the keys 13*a* and 13*b* are shown purely rudimentarily, and in practice the switching would incorporate precautions to preserve the loop at each end.

The data equipment at station A includes a data store 14, the output of which is applied to a modulator 15; the resulting modulated signal is fed to line through a high-pass filter 16*a*, one path of a hybrid network 17*a*, and a contact of key 13*a*. A relay contact 18 can substitute a preamble generator 19, controlled by a "START" key 20, for the data store 14 as the modulator input.

The return path of the hybrid 17*a* passes through a low-pass filter 21*a* to a demodulator 22, from which the demodulated return signal is applied to an error checking circuit 23.

Stations A and B may comprise identical apparatus, providing for transmission of data in either direction: but in the present description it is assumed that data transmission only from A to B is required, and only the apparatus appropriate for this purpose is shown at each station.

Station B is thus shown as a receiving station only. The data path from its change-over key 13*b* branches through one path of a hybrid network 17*b* and through a high-pass filter 16*b* to a demodulator 24; the "return" path is fed from a modulator 25 through a low pass filter 21*b*. The modulator 25 can receive its input alternatively from a start signal generator 26 or from a redundancy generator 27 by way of a change-over relay contact 28. The output of the demodulator 24 is applied to a data store 29, a supervisory lamp 30*b* and the redundancy generator 27.

After change-over at station B by key 13*b* the start signal generator 26 at B transmits a characteristic signal which is demodulated at station A, generating a signal to light the supervisory lamp 30*a*. This indicates to the subscriber at station A that station B is ready to receive, relay contact 28 at B having changed-over meanwhile to connect up the redundancy generator 27 to the modulator 25 for operation on the first portion of the message (the preamble) about to be received from station A.

At the next operation, the subscriber at station A closes his start key 20, which causes the preamble generator 19 to send out (over a high frequency path) the appropriate message preamble indicating to station B the type of transmission to be expected, and also including a synchronising signal. (The details of the transmission and operation will be discussed more fully hereinafter.) This preamble is demodulated at station B, and causes the redundancy generator 27 to evaluate the appropriate "redundancy" which is returned to station A over a low-frequency path. The redundancy received back at station A is compared in the error checking device 23 with the value stored therein of the corresponding redundancy calculated on the outgoing message during or before transmission, the comparison serving either to confirm correct receipt at B of the preamble or to cause it it be retransmitted from station A, if incorrect. If the preamble is confirmed as correct, relay 18 at station A operates to disconnect the preamble generator 19 and connect the data store 14 to the modulator 15.

Thereafter, data is transmitted block by block from the store 14 at station A to the store 29 at station B, redundancy being calculated for each block in turn and stored at station A for subsequent comparison with the corresponding redundancy received back from station B.

Eventually, an end-of-message code is detected, which causes the supervisory lamps at both stations to glow, indicating to both subscribers that the message transmission is completed.

The amount of redundancy to be transmitted over the backward channel is considerably less than the amount of data transmitted over the forward channel. A lower transmission speed can therefore be adopted for the backward direction than for the forward direction, and a smaller portion of the total channel bandwidth can be allocated for backward transmission. Thus, for apparatus connected over normal switched telephone channels, as in FIG. 1, transmission in the forward direction may be effected at a speed of 500 bits per second over a sub-channel occupying the band 900 c./s. to 1900 c./s.; backward transmission may be effected at perhaps one third of the forward speed over a sub-channel occupying the band 350 c./s. to 500 c./s. Higher rates of transmission would be possible over rented channels owing to their inherently quieter nature.

"Redundancy" is a term used in the data handling art to denote additional information associated with a message but not forming part of the message or having any message signification, but derived by a process of computation based on the content of the message; it provides a means of detecting or correcting errors which may have occurred in the handling of the message. The redundancy may take a number of forms, and may be employed in a variety of ways, but has no other significance than that of detecting or correcting errors in a message. In the present instance, the system provides for the transmission of data in blocks of predetermined size and for error detection by a "parity" system—that is, by the calculation of redundancy diigts from specified arrangements, or "groups," of all the data digits within the block at both ends of the circuit, and comparison at one of the ends of the locally derived redundancy digits with those transmitted from the other end for "parity" between them and for error correction by retransmission of the appropriate data blocks.

Apart from a "preamble" signal and an "end-of-message" signal, the forward transmission will consist of data and supervisory signals; the latter will be used either to confirm or cancel the blocks of data. The backward transmission will consist only of "redundancy" information.

The forward and backward transmission will proceed simultaneously, each over its individual subchannel.

Considering now the data transmission system in its more theoretical aspects, at the transmitting station A the data to be transmitted is arbitrarily divided in store 14 into blocks of fixed length, which do not necessarily conform to the divisions of the incoming data. The arbitrary blocks are transmitted without any other alteration than the interpolation of a supervisory (confirmation or cancellation) signal between the blocks.

In systems which use blocks of varying lengths it is customary to send a special signal which may comprise a sequence of characters to notify that the block has ended (and similarly it may be desirable to send a special character sequence to record that one of a succession of messages has ended). This invention is concerned with the problem which arises if the text of the message contains, by chance, the exact sequence of signals wich are used as service signals, e.g., for signalling "end-of-block."

It will be appreciated that if, for example, a false end-of-block signal appears prematurely, the receiving station will send a supervisory acknowledgement signal back at the same time as the sending station is finishing the forward transmission of the block. If the error detection equipment asks for the block to be retransmitted the same sequence of events will be repeated, and even if an alarm is given to summon a maintenance man the transmission of the message remains a difficulty.

For some applications the sequence used for a service signal or end-of-block signal can be chosen in such a way that it is unlikely to appear in the text of a message. However, if the message is in cipher or perhaps regrouped into a 5 unit code from, say, a 7 unit code the probability of the sequence appearing will be random and difficult to prevent. It is necessary to assume that if the message text is in a 6, 7 or 8 unit code while line transmission is made in 5 unit code, a true end-of-block signal will not appear in the message text in the form of the 5 unit code used for line transmission. The block end should be indicated by one or more characters in the 6, 7 or 8 unit code. Similarly in the case of a 5 unit cipher on tape it is desirable to use a sixth level on the tape to indicate the block end. Such special characters can be arranged to appear or not to appear in the final text as required.

The invention is based on the simple assumption that neither the message nor any individual block will contain *no* text, because in such a case nothing effective is recorded at the receiving station. Therefore every block will contain at least one character because otherwise the block is meaningless. Hence a requirement that each block must contain at least one character is not a serious limitation.

Accordingly, the sending station includes a line signal detector similar to that used at the receiving station to recognize the end-of-block signal. The contents of each block are therefore examined at both stations. False end-of-block signals (in "line code") are detected at both stations. At the sending station the detection of a false signal is used to interrupt the reading of the message to allow the normal cycle of procedure at the end of a block to be carried out. This may include the transmission of an error detection code to allow the receiving station to determine whether the contents of the block so far received are correct. Thereafter the sending station can start a new block according to its normal procedure following the receipt of a true end-of-block signal, and insert a special prefix signal to replace the characters falsely representing the end-of-block signal because such characters will have been removed by the receiving station. The sending station will respond to the backward supervisory signal exactly as if the normal block had been transmitted.

A typical method of error detection suitable for the data transmission system envisaged can be of the type in which redundancy is established for each block at both the sending and receiving stations, the redundancy being transmitted from one station to the other at the end of the block for error detection purposes. The use of a shift register to generate a "cyclic" code is an example. At any time that the block is completed the redundancy can be read off leaving the shift register ready to take the next block. When a false end-of-block signal reaches the receiving station it will assume that the following characters represent the redundancy and it is therefore necessary for the redundancy to fall immediately after the false end-of-block signal. If the redundancy is transmitted in the backward direction then the sending station must be prepared to compare it with its own redundancy before it proceeds with further text.

It is necessary to ensure that the special prefix signal inserted when the remainder of the interrupted block is transmitted is not detected as an end-of-block signal at the receiving station because otherwise it would be impossible to proceed with the message. At the receiving station it is not known that a false end-of-block signal has been received but it is possible to disable the end-of-block detector for the first character of every block. As it is assumed that every block must contain at least one character a proper end-of-block signal will never start a block. Hence the artificial reinserted end-of-block sequence passes into the message in place of the one removed at the receiver in mistake for a normal end-of-block signal.

In the embodiment shown in FIG. 2 the message to be transmitted is assumed to have been prerecorded upon punched cards or tape which is read by the card or tape reader 41. In normal operation a control unit 42 reads and processes the data from the reader 41 via a link 43, converting it from parallel to serial mode and/or adding Start and Stop elements to each character preparing it for retransmission. The processing also includes, as stated earlier, conversion from "message code" to "line code." The control unit 42 causes the reader 41 to step periodically by sending reading control signals over the link 44. Each character processed by the control unit 42 is then transmitted over the line 45. The control unit 42 is also linked with the true and false end-of-block detectors 46 and 47 over the links 48 and 49. When a true block-end signal (in "message code") is recognized by the true end-of-block detector 46 a signal is passed over the links 50 and 44 to interrupt the stepping and reading of the reader 41. Another signal is sent over the link 51 to the end-of-block generator 52 preparing it to generate and send the end-of-block signal (in "line code") over the link 53 to the control unit 42 which in turn sends the signal to the line 45. At the receiving station the end-of-block detector 54 receives the end-of-block signal via the control unit 55 and the link 56. The end-of-block signal from the generator 52 over the link 53 is not applied to the false end-of-block detector 47.

The end-of-block detectors 46, 47 and 54 are of the type shown in FIGS. 3–7.

The block diagram of FIG. 3 shows one of 50 channels, receiving intelligence from an incoming line 101, and passing intelligence forward to a terminal 102, via a storage device LS on the way. The store LS is a store which will hold all five intelligence elements of one telegraph character. Such a store is well known, and the operation of the store LS is not of consequence to the present application. The characters are retransmitted from the store LS to the terminal 102, which may be considered for the purposes of this specification to be an incoming terminal to the teleprinter or other message exchange. The messages which pass through the store LS contain inter alia, groups or sequences of characters which do not form part of the message per se, but which provide special information concerned with the processing of the message as a whole when it passes through the exchange. These special groups of characters may be used as precedence indicators, routing indicators, or for other supervisory functions.

11P is a common processing equipment associated with the 50 channels by a distributor 23C. In addition it is associated with the track 11D of a magnetic drum by means of a reading amplifier 11R and a writing amplifier 11W connected by an 8-character store 11S, comprising a pattern register. It is arranged that the distance between the two heads associated with the track 11D is so related to the drum speed that when no insertion is made, the characters read by 11R are passed horizontally through the pattern register store 11S and replaced by 11W in the same element position from which they were withdrawn. It should be understood that the position of 23C shown as a counter device in FIG. 4 (which gives details of the insertion control circuit I.C.S. of 11P) driven by counters 21C and 22C which define the element position of the message characters through clock pulses from 11P derived from the drum allows transfer to take place only from the channel with which it is temporarily associated, via the appropriate group $n$ of the leads 202($n$) to 206($n$), where $n$ is any one of the fifty channels. When a trigger 21F1 conducts (output 1) when a new character is present and it applies a signal at 21$f$1 to the terminal 201$b$ which is extended in conjunction with 23C to prepare the resetting of the channel trigger announcing a character to be added. Trigger 21F conducts responsive to a signal on terminal 201$a$($n$) opening gate G201($n$) when a new character is received. The trigger 22F aids 21F as will be described later.

It will be appreciated that the speed of reading from the drum track and of rewriting is far greater than the arrival of new characters on the individual lines, so that it may fairly be assumed that for the duration of association of any one channel $n$ with the processing equipment, i.e., during one position of 23C, static conditions will be found on terminal 201$a$($n$) and on terminals 202($n$)–206($n$) (feeding shift register 21S via gates G202–G206 the character just recorded), and the condition of 21F will be determined accordingly. It will be understood that the *effective* association for any one channel is during the inter-character pause, between the receipt of the last element of the character and the first element of the next, a period of about 70 ms., assuming that there are stop and start intervals between the last element of one character and the first character of the next. Thus, 21F will either remain in position 0, or be conditioned to position 1 by a coincidence on G201($n$) between a signal on 201$a$($n$) and signals from 21C, 22C and 23C, at the end of a cycle of 22C, just before 23C is advanced to its next distributor position. However, it is important to bear in mind that what is read from the drum in one cycle of 22C (one specified position of 23C) is not rewritten until the next cycle since the heads are eight character positions apart and the pattern register 11S holds the eight characters at any moment all from one channel, or divided between two channels according to the position of the cycle, the insertion of a character element at one end causing an element to be displaced from the other end of the pattern register to the writing head. Consequently trigger 21F must retain a record of the availability of a character from the channel with which 11P was last associated and from which it obtained the character stored in 21S ready for insertion in the information being rewritten.

Thus, the state of the triggers in FIG. 4 is that appropriate for writing information corresponding to the previously associated channel, the reading of which has already taken place in the previous position of 23C.

Considering 21F, it will be seen that, from the end of period 22C7, it is inevitably in position 0 (by virtue of 21F1 on G207), and inevitably remains there at least until the end of period 22C8 (since the operation of 21F to condition 1 depends on a signal on the 201$a$ control as well as on 21C5 and 22C8), just before 23C changes to a new position; and 21F will then be conditioned accordingly (in that last instant of time before 21C5 goes to 21C1, 22C8 goes to 22C1, and 23C goes to its next position), either for writing in a new character (21F1 condition) or for re-recording (21F0 condition) the information corresponding to that channel in the time position of the next channel. A new character due to be written in during the next cycle of 22C is introduced into 21S at the end of the last cycle when 21F was controlled and is driven out of 21S at 21S5 during 22C8 of this next cycle.

FIG. 5 shows the reading circuit and includes shift registers 31S–38S which constitute 11S of FIG. 3. The elements read from the drum by the reading amplifier 11R are applied progressively to position 1 of these registers under the control of the counter 22C at gates G301, G302, etc. As the intelligence is applied to the shift registers, stepping pulses are applied also under control of 22C, via gates G303, G304, etc. It will be observed that the stepping pulses are applied to 31S in position 22C1 only, but that for each of registers 32S . . . 38S, stepping pulses are applied in two positions of 22C. The earlier of these two positions has no bearing on input and will be described in connection with FIG. 6. The eight characters read in one cycle are written into 31S . . . 38S in time positions 22C1 . . . 22C8. By the time 38S is filled, 22C and 21C are at the ends of their cycles, and at the next 11*p* pulse, both will be returned to position 1, and 23C advanced to its next position.

The beginning of the portion of drum track which has just been read is now under the writing head, and the position of 23C corresponds to the channel which corresponds to the next portion of drum track to be read.

FIG. 6 is concerned entirely with the rewriting of the intelligence via the writing amplifier 11W, together with insertion of new characters. For explanatory purposes two columns of gates are shown. The left hand column G401 . . . concerns the condition when there is no new character to insert (21F at 21F0 having output 21*f*0) and the existing eight characters are returned while the counter 22C steps from 1 to 8. It will be evident that, as the contents of each shift register is being passed to the writing amplifier, a new character is being read via 11R, FIG. 3, to take its place, the incoming and outgoing gates for each register, e.g., G301, G303 and G401 being controlled by the same position (e.g., 22C1) of 22C. Thus as the first character of one set is pulsed out of the pattern register at the end 5, element by element, to the drum it is replaced element by element at the entrance 1 by the first character of the next set and so on. The new character will be associated with the following channel as indicated by 23C.

When a new character is being inserted and 21F1 is conducting, the right hand column of gates in FIG. 6 is effective. With these gates the contents of 32S–38S and 21S are recorded, the contents of 31S being discarded. It is for this reason that the shift registers 32S–38S are each driven in two positions of 22C. The earlier position is used for extraction and in the following cycle the newly read character is inserted. It will be seen that in these circumstances the first character of the new set will be received on 31S from the drum, at the same time that the character from 32S is being transmitted to the drum as the first character of the previous set, and so on.

In order to allow 21F to reset at the termination of 22C7 and to be free to reoperate for the next channel, in accordance with the condition of 201*a*, the trigger 22F is used to control the recording of the last character, taking over the function of 21F1 at the end of 22C7, and being restored at the end of 22C8.

FIG. 7 gives an example of a detector which might be used to record a particular combination or set of combinations of eight predetermined characters, for an arbitrary channel defined by 22C3.

It should be noted that, for the example shown below, the detection made is not exclusive, since alternate elements of the characters are ignored. Clearly, for detecting a single combination all elements must be individually examined, either for giving positive controls (as in FIG. 7), or inhibitory controls in which the *absence* of the correct elements exerts a positive inhibitory control on the output to terminal 501. Such an arrangement is not shown, but is well known to those skilled in the art.

The triggers 51F, 52F, examine alternate elements of the characters taken in sets of 4. It is desired to make the examination as soon as the last character has been received from the channel, so that this character will be in 21S. Since reception and retransmission are continuing operations, it is desirable to make the examination in two parts. Hence, 51F and 52F are set to position 0 at the end of period 22C2, in time position 23C2 (say) via gates G502, G503 and the first four characters are examined in period 22C6 of the same position, 23C2, after they have been completely staticised in 32S–35S, 51F triggering to position 1 if the sought-for conditions are found. Similarly, when the next four characters are on 36S–38S and 21S, 52F operates to position 1 at time 22C1 of the next cycle, i.e., 23C2, if, again, the sought-for conditions are found. If both 51F1 and 52F1 conduct, a signal is passed during 22C2 of the next cycle, i.e., 23C3 to the terminal 501, via G501 in the position of 23C corresponding to the next channel to that for which the eight-character combination is detected.

It will be evident that other pairs of triggers such as 51F and 52F can be added to detect other character combinations, or each can be used to detect and to signal a different signal combination, a separate gate such as G501 being provided for each trigger. It will be evident that the output of such triggers can be used for any desired purpose.

Similarly it is equally possible to allow the triggers such as 51F, etc., to be used for translation purposes, the translated character combination being returned to the incoming channel for storage and retransmission or elsewhere as needs be.

The arrangement described illustrates only an example and it should be understood that the processing carried out with respect to a character or a plurality of characters can take many forms. Similarly for the indicator detection it should be understood that a variety of combinations of various length can be handled by the common circuit of all the channels with which it is associated from time to time.

The end-of-block generator 52 in FIG. 2 is illustrated in greater detail in FIG. 8, and has a code store comprising ten rows of ferromagnetic storage cells arranged in five columns designated 91–95.

For the sake of clarity, only one column has been shown since the operation of each column with respect to its appendant triggers during the translation and storage processes is the same. It will be readily understood that as there are five columns of cells each row will consist of five cells, which due to their initial setting are representative of the five elements of the code of the digit concerned. It will be seen from FIG. 8 that the ten rows are threaded by half-read/half-write conductors "0X" to "9X." The cells in row "0X" are set so that the conditions of the five elements stored therein are representative of the particular code used for a pulse stored in the bottom cell of a column 81 of ferromagnetic cells, whereas those in rows 1X to 9X are set so that they may be representative of the code for information stored in the corresponding cells of column 81. The rows, as well as being threaded by half-read/half-write conductors "0X" to "9X" are also threaded by half-read/half-write conductors "10X" to "19X" and "20X" to "29X," respectively, i.e., row "0X" is pulsed by row wires "0X," "10X," "20X" whilst row "1X" is pulsed by row wires "1X," "11X" and "21X" and so on. Thus if the three sets of rows in column 81 are regarded as "tens," "units" and "hundreds," respectively, any combination of three cells in column 81, one from each group, provides a total of 1000 combinations that can be stored. For each row 0X, 10X and 20X the same code combination is stored in columns 91–95. Thus whenever the three groups of cells in column 81 are scanned cyclically, the same code will always be generated for the same combination. If the arrangement of FIG. 8 is regarded as being a counter serving a number of channels then it will generate a unique character code for each channel whenever the number of the channel concerned is recorded in column 81. The counter logic control circuits can be those described in U.S. Patent No. 3,081,451. The counter logic is arranged to record the number of each data channel when it is activated by either the true block-end signal (in "message code") or the false block end signal (in "line code"). Then when the channel number is translated into the unique character code for that channel this code forms an end-of-block signal unique to that channel.

The translation of a channel number into the corresponding unique character code will now be described in greater detail with reference to FIG. 8.

In the initial or rest conditions all triggers of the temporary store and associated with the five columns of the code store are in the "0" condition; similarly, trigger 30F common to all columns is in the same condition. Counter 3C rests in position 3C1; stepping of this counter takes places on the appearance of condition 30*f*1, which denotes that either a "unit," "tens" or "hundreds" digit has been read from column 81 of the counter. In this particular example it could be considered that the next serial number to be indicated is 241, i.e., a "1" condition will be read from the cells on "units" row "1X," "tens" row "13X" and "hundreds" row "22X" during the access selector cycle. On the commencement of the access selector cycle and when row "0X" is being scanned, nothing is read from column 81. At the same time as half-read pulses 1W1 are being applied to row "0X" and the column wire of column 81, they are also applied over the same row wire and to the five column wires of the five cells in the transmitting matrix, the conditions of these cells being indicative of the elements of a telegraph code for "zero" or "0." Where any of the five cells are in the "1" condition reading will take place at pulse 1W1 and cause the associated amplifiers, which may be any of 91R to 95R to conduct via the output conductors and in consequence give an output such as 91R to the associated trigger such as 91F which conducts at 91*f*1. This condition appears at a gate such as 3G1 leading to writing amplifier 91W and to a gate such as 3G2. On the following half-write pulse 1W2 and "1" read from the cell is rewritten back into the same cell; and at the end of the pulse 91F is reset to 91F0. Where any of the five cells are in a "0" condition no such reading takes place, therefore the associated trigger such as 91F remains conducting at 91F0, hence the conditions of the five cells continue to indicate the particular five element telegraph code for "zero" after the read-write/cycle.

Since the reading and rewriting of the five elements of the telegraph code from, and back into the cells of the particular row which is being scanned takes place simultaneously, and since the action of the triggers associated with each column the same in operation, it is only necessary to describe the action of triggers 91F, 41F, 51F, and 61F associated with the cells in column 91 in which the first elements of the telegraph code digits are stored for digits "0" to "9," i.e., "0" in row "0X" to "9" in row "9X"; the remaining four elements of the code are stored in the cells of the same row of the other four columns, i.e., columns 92, 93, 94 and 95. When row "1X" is being scanned a "1" condition is read from column 81 of the counter and is indicative of the "units" value of the serial number which in this case is 1.

Reading amplifier 81R will therefore conduct causing 81*r* to appear at trigger 30F which in turn conducts at 30F1. 30*f*1 appears at counter 3C and prepares its stepping circuit. 81*r* also appears at trigger 36F which conducts at 36F1; this condition appears at gate 3G4 leading to trigger 41F with 3C1. If 91F1 is conducting through "1" being read from the cell in row "1X" of column 91 of the counter (this condition being indicative of the first element of the five unit code), 91*f*1 will appear also at gate 3G4 and trigger 41F to 41F1 when 91F resets. Hence the condition of the first element is registered in this trigger. Similarly, if the condition of the cells of the same row in the four remaining columns, and indicating the condition of the other four elements of the telegraph code for 1, were in the "1" condition, operation of their respective reading amplifiers would take place, and their respective triggers corresponding to trigger 91F and 41F would in turn be triggered to the "1" position. However the five element code for the particular units digit might be 11101 and therefore only triggers 91F, 92F, 93F and 95F would conduct at their "1" positions followed by 41F, 42F, 43F and 45F respectively; triggers 94F and 44F would remain conducting at 94F0 and 44F0. The conditions now registered in triggers 41F to 45F and which are indicative of the telegraph code elements for a "units" value of 1 could now be withdrawn immediately if required or at some time before the commencement of the next scanning cycle of the access selector. Where such triggers of this group are in a "1" position, resetting to the "0" condition takes place after withdrawal by conditions "X0" appearing, this condition is indicative of an external pulse from the forward storage or registering equipment (not shown) which indicates that withdrawal has taken place. Condition 91*f*1 has also appeared at gate 3G1, and on half-write pulse 1W2 the "1" condition read from column 91 is rewritten in the cell of the row from when it came. Similarly conditions 92*f*1, 93*f*1 and 95*f*1 would have appeared at the corresponding gates to their respective columns and the condition read would therefore be rewritten into cells of the same row in their respective columns. Since the condition in the cell of column 94 was "0" and nothing was read therefrom, there is no requirement to write back into that cell. Triggers 91F, 92F, 93F and 95F will be reset to their "0" position on pulse 1W2 by the appearance of conditions such as 31*f*1 at their respective gates such as 3G2. Trigger 36F is reset to 36F0 on the same 1W2 pulse by its appearance with 36*f*1 at gate 3G3. 90F1 will remain conducting during two 1W2 pulses and then 90F0 will conduct again. The latter allows 3C to step from 3C1 to 3C2. The scanning cycle of the access selector continues, and as each succeeding row of five cells in the translating matrix is scanned, the conditions therein, if they are in a "1" condition, are rewritten via their respective writing amplifiers such as 31W, whilst if they are in a "0" condition no change or rewriting takes place. When reading amplifier 21R of column 81 of the counter circuits again conducts through "1" being read from column 81 on row "13X" (which indicates the serial number "tens" digit in this case is 4) 81*r* appears and 90F1 conducts, 81*r* also appears at trigger 36F which conducts at 36F1, 36*f*1 this appears at gate 3G5. If at this instance 91F1 is conducting through a "1" condition being read from the cell in row "13X" of column 91, 91*f*1 appears at gate 3G5 and which now opens and causes 51*f* to conduct at 51F1. Hence the condition of the first element of the five element code indicative of the decimal number "tens" digit is registered in this trigger. Again, as in the case of registration of the conditions of the "units" elements in trigger 42F to 45F, if the conditions of the cells in the remaining four columns of row "13X" were in a "1" condition, operation of their respective reading amplifiers such as 91R would take place, and their respective triggers corresponding to 91F and 51F would in turn be triggered to the "1" condition. If however, and as explained previously, the five digit code for the "tens" value of the serial number was 11001, only triggers 91F, 92F, and 95F would be triggered to the "1" condition as would in consequence their associated triggers 51F, 52F and 55F; triggers 93F and 94F and their associated triggers 53F and 54F would remain at "0." The conditions registered in triggers 51F to 55F are now indicative of the five elements of the "tens" digit of the decimal number and may be withdrawn in a like manner to those held in triggers 41F to 45F. Again, and as described with respect to the "units" digit registration, triggers such as 91F, which are conducting at their "1" positions, are reset to their "0" positions on pulse 1W2, and the condition is rewritten in the cells of the row from whence they were "read," other triggers in the "0" condition being unaffected as are the cells of the columns of that particular row with which the triggers are associated. Triggers 36F is reset to 36*f*0 as before. 3C steps to 3C3.

Finally as row "22X" is being scanned and as a "1" is read from that row in column 81 and which is indicative of the decimal number "hundreds" digit (in this case 1), reading amplifier 81R again conducts and in consequence 81*r* causes 30F1 to conduct; 81*r* also appears at trigger 36F which conducts at 36F1, this condition appearing at gate 3G6 to trigger 61F with 3C3. In this instance as in previous operations of 81R, if 91F1 conducts through a "1" condition being read from the cell in row "22X" of column 91. 91*f*1 will appear at gate 3G6 to trigger 61F to 61F1; hence the condition of the first element of the five elements indicative of the decimal number "hundreds" digit is registered in this trigger. If the condition of the cells in the remaining four columns of the row "22X" were in a "1" condition, operation of their respective reading amplifiers such as 91R would take place and their respective triggers corresponding to 91F and 61F would in turn be triggered to the "1" condition. Again in this case if the five digit code for the "hundreds" value of the serial number was 10001, only triggers 91F and 95F would be triggered to the "1" condition as would in consequence 61F and 65F, and triggers 92F, 93F, 94F and their associated triggers 62F, 63F, 64F would remain at "0."

The conditions registered in triggers 61F to 65F are now indicative of the five elements of the "hundreds" digit value of the decimal number and may be withdrawn in a like manner as the elements previously stored in triggers 41F to 45F and 51F to 55F for the "units" and "tens" digit values respectively. It will be seen that this withdrawal may take place in any order, i.e., "units," "tens," "hundreds" or "hundreds," "tens" and "units" at any time before commencement of the next access selector cycle which commences on a counting pulse appearing at the counter circuits. Immediately withdrawal has taken place, triggers 41F to 45F, 51F to 55F and 61F to 65F are reset to their "0" positions by the appearance of the exterior pulse "XP" from the forward storage medium. Triggers 91F to 95F and 36F are reset to their "0" positions as previously described, and counter 3C steps to position 3C1.

In certain circumstances it might be necessary to translate the number into more than one code and it will be apparent that this could be accomplished quite easily by adding groups of extra columns such as 91 to 95 of greater or lesser number per group dependent on the number of elements per "digit" of the particular code. The rows of cells of such additional groups would be threaded by the row wires of corresponding rows of cells of other groups, thus all rows of all groups would be scanned simultaneously by the common scanning equipment. The columns of each group would have, of course, their own reading and writing amplifiers, and common equipment together with their own particular triggers for the purposes already described with regard to recording, transfer, and storage.

The receiving station transmits supervisory signals which cause the sending station to repeat the block or continue with the message. The supervisory signals together with this technique are well known, and since they do not form part of the present invention the equipment relating to these signals is not shown in the drawing.

If a false end-of-block signal appears in *"line code"* in the message text the false end-of-block detector 47 is operated by signals over the link 49 from the control unit 42 and sends a signal over the link 57 to the control unit 42 to interrupt the stepping and reading of the reader 41 and to prepare for the normal cycles of operations as though the end of a block had in fact been detected.

If the subsequent backward supervisory signal from the receiving station indicates that transmission should continue, the false end-of-block detector 47 sends a signal over the link 58 to the end-of-block generator 52 to prepare the latter to generate and send the end-of-block signal over the line 45. The interruption to the reader 41 is meanwhile maintained. The false end-of-block detector 47 is temporarily disabled by a signal received from the end-of-block generator 52 over the link 59. The true end-of-block detector is also temporarily disabled by the control unit 42, so that neither of the end-of-block detectors will respond to the first outgoing character of the resumed transmission.

At the receiving station a trigger in the end-of-block detector 54 is left operating after the previous forward end-of-block signal has been received, and this trigger when operated prevents the detector from operating in the normal manner in response to the first character of the next block.

As shown in FIG. 9 a character detector CD examines each start/stop character by means of an asynchronous time scale. It transfers the elements making up each character to the end-of-block detector FB via an AND gate G901. When the end-of-block detector FB recognizes an end-of-block sequence it operates trigger 9F to 9F1. Gate G901 is closed by the removal of 9*f*0 and so does not pass the next character received from CD to the detector FB. 9F is restored to 9F0 by a pulse received from CD at the end of its line examining time scale, so that the second character received after the end-of-block sequence is now passed to EB.

Alternatively, if each block is completed by redundancy, which appears after the end-of-block sequence, a counter 9C can count the redundant characters and when these are complete it sets 9F, via the dotted line, to 9F1. Again the trigger is reset to 9F0 by the time scale in CD. In this case there is no need for a connection from EB to 9F.

The received data is passed from the control unit 55 over the link 60 to the tape punch 61. The tape punch 61 will of course record the special re-inserted end-of-block signals received, thus replacing correctly the data originally read from the reader 41 and incorrectly interpreted as a supervisory signal. A signal buffer can conveniently be inserted in the link 60 to hold a number of characters equal to an end-of-block signal. Such characters pass out one at a time, but if the detector 54 receives the end-of-block signal the contents of the buffer are then destroyed.

It is to be understood that the foregoing description of specific examples of this invention is made by way of example only and is not to be considered as a limitation on its scope.

What we claim is:

1. A data transmission system for transmitting individual variable length blocks of data from sending stations to receiving stations over channels in the forward direction and supervisory information from said receiving stations to said sending stations over the channels in the backward direction, said sending stations comprising data character storage means for storing messages, reading means for reading out data characters stored in said data storage means, control means for controlling said reading means for transmitting said data characters over the channels connecting said sending and said receiving stations, first detection means for detecting in the data characters read a true end of block signal sequence, a second detection means for detecting in the data characters read a sequence similar to the true end-of-block signal sequence;

said control means comprising means for stopping the reading of data characters from the storage means responsive to said similar sequence, generating means for generating and transmitting generated end-of-block signals responsive to the detection of said similar sequence, receiving station detection means in said receiving stations for removing end-of-block signals from the data received, said receiving stations further comprising inhibiting means operated responsive to said generated end-of-block signals for causing said receiving station ot reinsert that part of the message previously removed, and said inhibiting means comprising blocking means for blocking said receiving station detection means for one data character.

2. The data transmission system of claim 1 where said sending stations comprise blocking means for blocking said first and second detection means for one data character responsive to said end-of-block signal sequence.

3. The data transmission system of claim 2 wherein said reading means comprises a reading head for reading out said characters from said data storage means, a pattern shift register for storing the read data characters, said pattern shift register comprising an individual shift register for each of the data characters making up a message block, time controlled synchronized gating means for coupling said individual shift registers to said reading head, and means for controlling said gating means to enable said pattern register to shift either responsive to the receipt of data characters from said storage means or responsive to said generated end-of-block signals.

4. The data transmission system of claim 3 including writing means for recording data characters into said storage means, said writing means comprising head means coupled to said storage means, first writing gate means for coupling said pattern register to said writing head means, and second writing gating means for coupling said generated end-of-block signals to said writing head means responsive to the generation of said last named signals.

5. The data transmission system of claim 4 wherein said first detection means comprises detection trigger means, and detection gate means operated responsive to said sequence to operate said detection trigger means to provide a detection signal, said detection gate means having as inputs the outputs of the characters from the pattern register making up the end-of-block sequence.

References Cited

UNITED STATES PATENTS

| | | | |
|---|---|---|---|
| 2,406,023 | 8/1946 | Locke | 178—22 |
| 2,406,829 | 9/1946 | Haglund et al. | 178—22 |
| 3,154,638 | 10/1964 | Van Dalen | 178—23.1 |

THOMAS A. ROBINSON, *Primary Examiner.*

U.S. Cl. X.R.

178—23